(12) United States Patent
Miyachi

(10) Patent No.: US 11,785,149 B2
(45) Date of Patent: Oct. 10, 2023

(54) SERVER AND COMPUTER PROGRAM FOR SERVER FOR ESTABLISHING A CONTINUOUS CONNECTION WITH A COMMUNICATION DEVICE TO PROVIDE SCREEN DATA

(71) Applicant: BROTHER KOGYO KABUSHIKI KAISHA, Nagoya (JP)

(72) Inventor: Keisuke Miyachi, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/064,974

(22) Filed: Dec. 13, 2022

(65) Prior Publication Data

US 2023/0112402 A1  Apr. 13, 2023

Related U.S. Application Data

(63) Continuation of application No. 17/679,191, filed on Feb. 24, 2022, now Pat. No. 11,582,356.

(30) Foreign Application Priority Data

Feb. 26, 2021 (JP) ................................ 2021-030720

(51) Int. Cl.
*H04N 1/00* (2006.01)
*H04N 1/327* (2006.01)
*H04L 67/55* (2022.01)

(52) U.S. Cl.
CPC ......... *H04N 1/00244* (2013.01); *H04L 67/55* (2022.05); *H04N 1/0097* (2013.01);
(Continued)

(58) Field of Classification Search
CPC ........... H04N 1/00244; H04N 1/00408; H04N 1/00501; H04N 1/32786
See application file for complete search history.

(56) References Cited

U.S. PATENT DOCUMENTS

2013/0194628 A1* 8/2013 Kamimoto ........... H04N 1/0044
358/1.15
2017/0093865 A1 3/2017 Watanabe et al.
(Continued)

FOREIGN PATENT DOCUMENTS

JP 2017-068722 A 4/2017

OTHER PUBLICATIONS

Notice of Allowance dated Oct. 6, 2022 from parent U.S. Appl. No. 17/679,191.

*Primary Examiner* — Benjamin O Dulaney
(74) *Attorney, Agent, or Firm* — Scully, Scott, Murphy & Pressser, PC

(57) ABSTRACT

A server includes memory, a connection establisher, a first transmission request receiver, a first determiner, a first screen data transmitter, a second screen data transmitter, and a first disconnector. The connection establisher establishes continuous connection with a communication device. The first transmission request receiver receives a first transmission request t for displaying a setting screen corresponding to a first type of service. In response to the first transmission request being received from the external device, the first determiner determine whether a second type of service is currently provided. The first screen data transmitter transmits first screen data for displaying a first setting screen to the external device in response to the first determiner determining that the second type of service is not currently provided. The first disconnector disconnects the continuous connection in response to selection of a disconnection button included in the first setting screen displayed on the external device.

9 Claims, 10 Drawing Sheets

(52) U.S. Cl.
CPC ..... *H04N 1/00212* (2013.01); *H04N 1/00344* (2013.01); *H04N 1/00408* (2013.01); *H04N 1/00501* (2013.01); *H04N 1/00925* (2013.01); *H04N 1/32765* (2013.01); *H04N 1/32786* (2013.01); *H04N 2201/0094* (2013.01)

(56) References Cited

U.S. PATENT DOCUMENTS

| | | | |
|---|---|---|---|
| 2019/0004749 A1* | 1/2019 | Nakajima | G06F 3/1236 |
| 2022/0141205 A1* | 5/2022 | Kurihara | H04N 1/4433 |
| | | | 726/7 |

* cited by examiner (Consumable Service Processing)

FIG. 7 (For Selection of Button B3)

(For Selection of Button B2 or B4)

(Display of Setting Screen Using Printer 10)

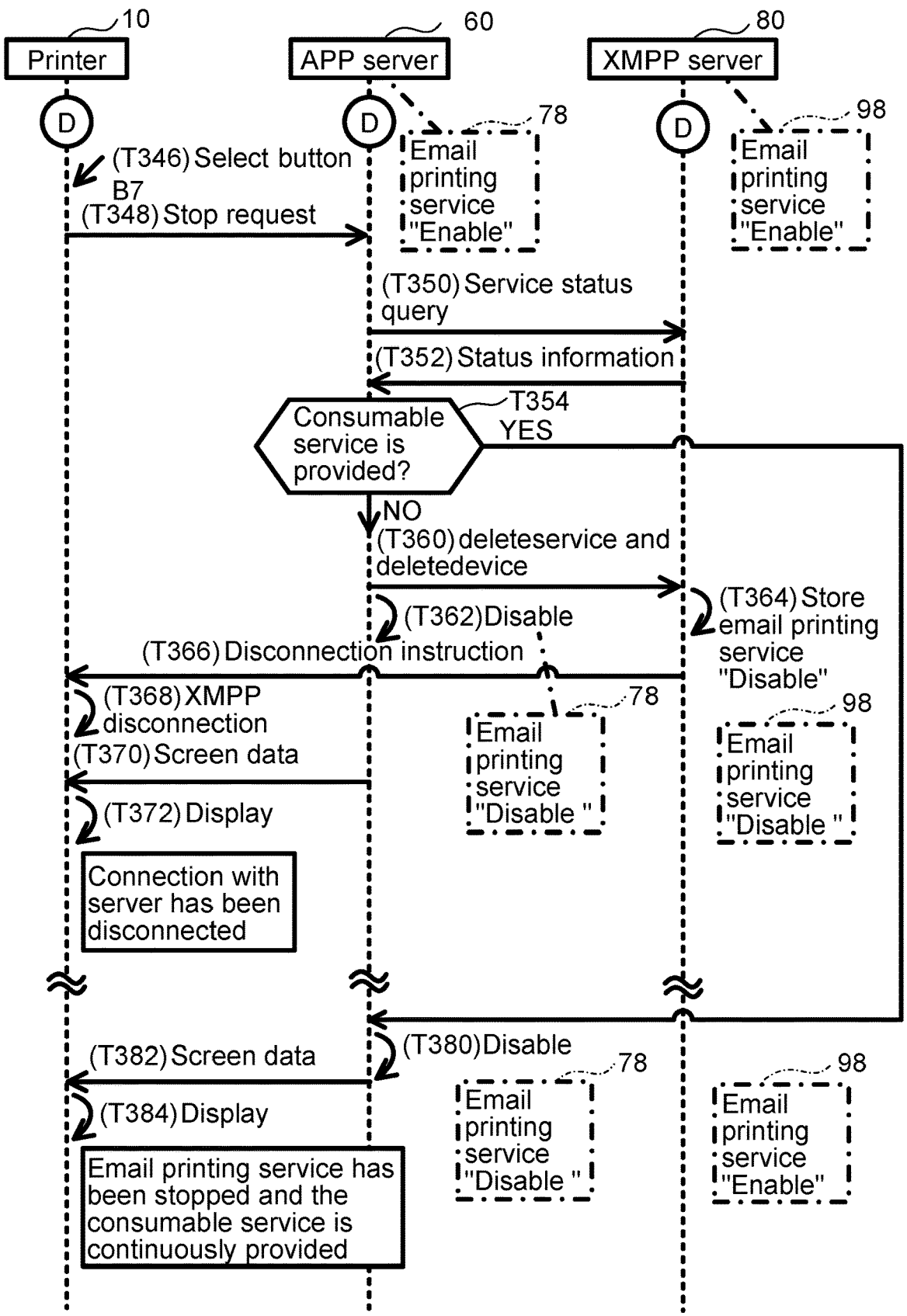

SERVER AND COMPUTER PROGRAM FOR SERVER FOR ESTABLISHING A CONTINUOUS CONNECTION WITH A COMMUNICATION DEVICE TO PROVIDE SCREEN DATA

CROSS-REFERENCE TO RELATED APPLICATION

This application is a continuation application of U.S. Ser. No. 17/679,191 filed on Feb. 24, 2022 and claims priority from Japanese Patent Application No. 2021-030720 filed on Feb. 26, 2021, the content of which is incorporated herein by reference in its entirety.

TECHNICAL FIELD

Aspects of the disclosure relate to a server that performs server-push communication related to provision of a service.

BACKGROUND

A multifunction peripheral, a device information collecting server, and a service providing server capable of providing a plurality of services are disclosed. The multifunction peripheral and the device information collecting server establish an XMPP (standing for Extensible Messaging and Presence Protocol) connection. The device information collecting server collects information for providing a service from the multifunction peripheral and transmits a notification to the multifunction peripheral by using an XMPP connection.

SUMMARY

According to an aspect of the disclosure, a server includes memory, a connection establisher, a first transmission request receiver, a first determiner, a first screen data transmitter, a second screen data transmitter, and a first disconnector. The connection establisher establishes continuous connection with a communication device in response to a first instruction being received from an external device. The first instruction indicates a start to provide a first type of service related to a communication device. The continuous connection is used to perform server-push communication related to the provision of the first type of service with the communication device. The connection establisher does not establish a new continuous connection with the communication device in response to a second instruction being received from the external device in the continuous connection established with the communication device. The second instruction indicates a start to provide a second type of service related to the communication device. The continuous connection is used to perform server-push communication related to the provision of the second type of service with the communication device. The first transmission request receiver receives a first transmission request from the external device. The first transmission request is a signal requesting to transmit screen data for displaying a setting screen corresponding to the first type of service. In response to the first transmission request being received from the external device, the first determiner determine whether the second type of service related to the communication device is currently provided, using a list stored in the memory. The list includes first status information indicating a status of providing the first type of service related to the communication device, and second status information indicating a status of providing the second type of service related to the communication device. The first screen data transmitter transmits first screen data for displaying a first setting screen to the external device in response to the first determiner determining that the second type of service is not currently provided. The first setting screen includes a disconnection button to disconnect the continuous connection. The second screen data transmitter transmits second screen data for displaying a second setting screen to the external device in response to the first determiner determining that the second type of service is currently provided. The second setting screen does not include the disconnection button. The first disconnector disconnects the continuous connection in response to selection of the disconnection button included in the first setting screen displayed on the external device.

According to another aspect of the disclosure, a non-transitory computer readable storage mediums stores a computer program for a server including memory and a computer. The computer program includes instructions that, when executed, cause the computer to function as a connection establisher, a first transmission request receiver, a first determiner, a first screen data transmitter, a second screen data transmitter, and a first disconnector.

BRIEF DESCRIPTION OF THE DRAWINGS

FIG. 10 is a sequence diagram continued from FIG. 9.

DETAILED DESCRIPTION

The disclosure relates to a server in which only a single, continuous connection is established for performing communication related to provision of a plurality of services with a communication device, and provides a technique for preventing server-push communication from becoming impracticable due to disconnection of the continuous connection against a user's intention in the server.

Figure 1:
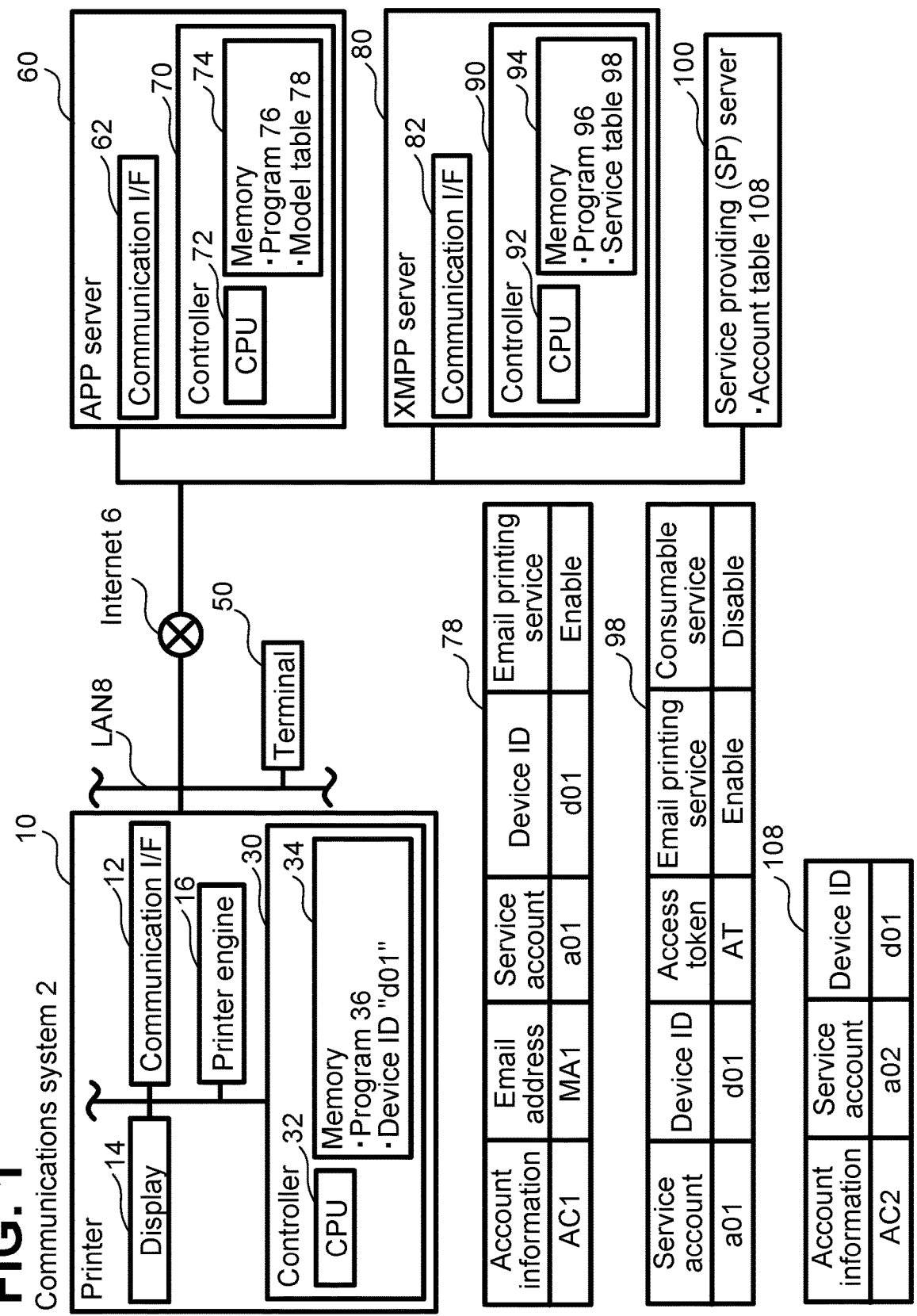
FIG. 1 is a configuration diagram of a communication system.

Configuration of Communication System 2: FIG. 1

As illustrated in FIG. 1, the communication system 2 includes a printer 10, a terminal 50, an application (APP) server 60, an XMPP server 80, and a service providing server (hereinafter, referred to as an "SP server") 100. The printer 10 and the terminal 50 are connected to a local area network (LAN) 8. The printer 10 and the terminal 50 can communicate with each other via the LAN 8. The LAN 8 may be either a wired or wireless LAN. The LAN 8 is connected to the Internet 6. The APP server 60, the XMPP server 80, and the SP server 100 are connected to the Internet 6. The devices 10, 50, 60, 80, and 100 are connected to the Internet 6 and can communicate with each other via the Internet 6.

Configuration of Printer 10

The printer 10 is a peripheral device (of, for example, the terminal 50) having a print function. The printer 10 may be a multifunction peripheral capable of executing a scan function, and a FAX function in addition to the print function. The printer 10 includes a communication interface (hereinafter referred to as an "I/F") 12, a display 14, a printer engine 16, and a controller 30.

The communication I/F 12 is connected to the LAN 8. The communication I/F 12 may be a wireless I/F or a wired I/F. The display 14 is a so-called touchscreen and functions as an operation unit. The printer engine 16 is a print mechanism of an inkjet system, a laser system, or the like.

The controller 30 includes a CPU 32 and memory 34. The CPU 32 performs various processing in accordance with a program 36 stored in the memory 34. The memory 34 includes a volatile memory and a nonvolatile memory. The memory 34 stores a device ID "d01" that is an ID for identifying the printer 10.

Configuration of APP Server 60

The APP server 60 is installed on the Internet 6 by a vendor of the printer 10. The APP server 60 is a server for providing an email printing service. Email printing is a function that causes the printer 10 to print an image represented by image data included in an email. The email printing service is a service whose provision can be started or stopped by the APP server 60. In other words, the email printing service is a service provided by using the APP server 60.

The APP server 60 includes a communication interface 62 and a controller 70. The devices 62 and 70 are connected to a bus line (reference numeral is omitted). The communication I/F 62 is connected to the Internet 6. The controller 70 includes a CPU 72 and memory 74. The CPU 72 performs various processing in accordance with a program 76 stored in the memory 74. The memory 74 includes a volatile memory and a nonvolatile memory. The memory 74 stores a model table 78 in addition to the program 76.

The model table 78 is a table in which information related to the email printing service is registered. The model table 78 stores a record containing account information, an email address, a service account, a device ID, and status information of the email printing service in association with one another.

The account information is account information of a user who uses the email printing service, and includes, for example, a user ID and a password. The email address is an email address assigned to a printer for performing the email printing service. The email address is generated by the APP server 60. The service account is identification information for managing the printer. The service account is generated by the XMPP server 80. The device ID is information for identifying the printer. The status information of the email printing service is information indicating whether the email printing service is provided to the user of the printer, and indicates either Enable indicating that the service is provided or Disable indicating that the service is not provided.

Configuration of XMPP Server 80

The XMPP server 80 is installed on the Internet 6 by the vendor of the printer 10. The XMPP server 80 is a server for performing server-push communication related to the provision of various services with the printer 10.

The XMPP server 80 includes a communication I/F 82 and a controller 90. The devices 80 and 90 are connected to a bus line (reference numeral is omitted). The communication I/F 82 is connected to the Internet 6. The controller 90 includes a CPU 92 and memory 94. The CPU 92 performs various processing in accordance with a program 96 stored in the memory 94. The memory 94 includes a volatile memory and a nonvolatile memory. The memory 94 stores a service table 98 in addition to the program 96.

The service table 98 is a table in which information relating to a printer is registered. The service table 98 stores a record containing a service account, a device ID, an access token, status information of an email printing service, and status information of a consumable service in association with one another. The access token is authentication information for establishing an XMPP session with the printer. The status information of the consumable service is information indicating whether an automatic consumable shipping service is provided to the user of the printer, and indicates either Enable indicating that the service is provided or Disable indicating that the service is not provided.

Configuration of SP Server 100

The SP server 100 is a server for providing the automatic consumable shipping service (hereinafter referred to as a "consumable service"). The consumable service is provided by the SP server 100, is a service whose provision cannot be started or stopped by the APP server 60. In other words, the consumable service is a service provided without using the APP server 60. The SP server 100 is installed by a company different from the vendor of the printer 10. In a modification, the SP server 100 may be installed by the vendor of the printer 10.

The SP server 100 stores an account table 108. The account table 108 is a table in which information related to the consumable service of a printer is registered. The account table 108 stores a record containing account information, a service account, and a device ID in association with each other. The account information is information related to a user who uses the consumable service, and includes, for example, a user ID, a password, a name, an address, and credit card information.

Figure 2:
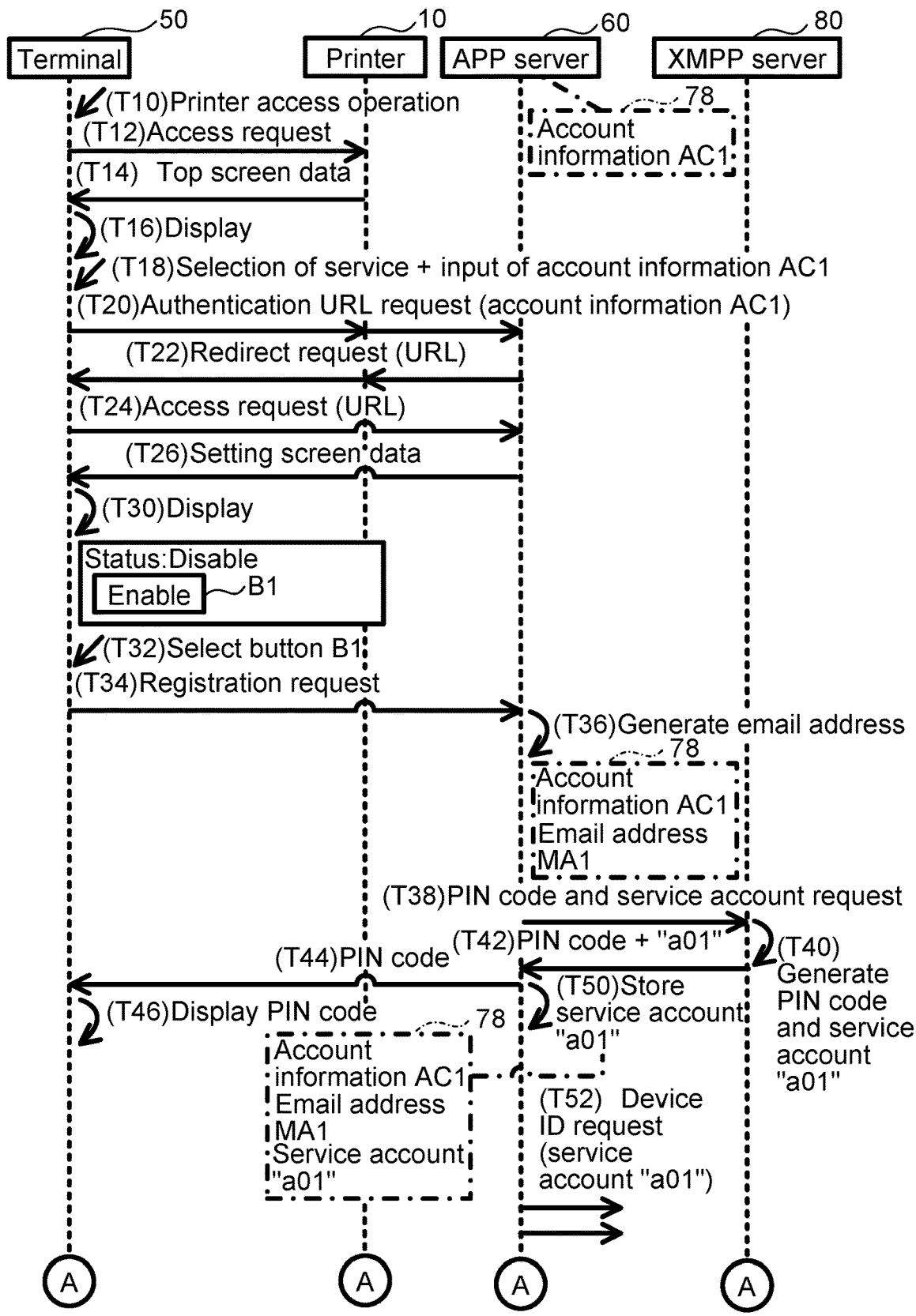
FIG. 2 is a sequence diagram of a process for receiving an email printing service.
Figure 3:
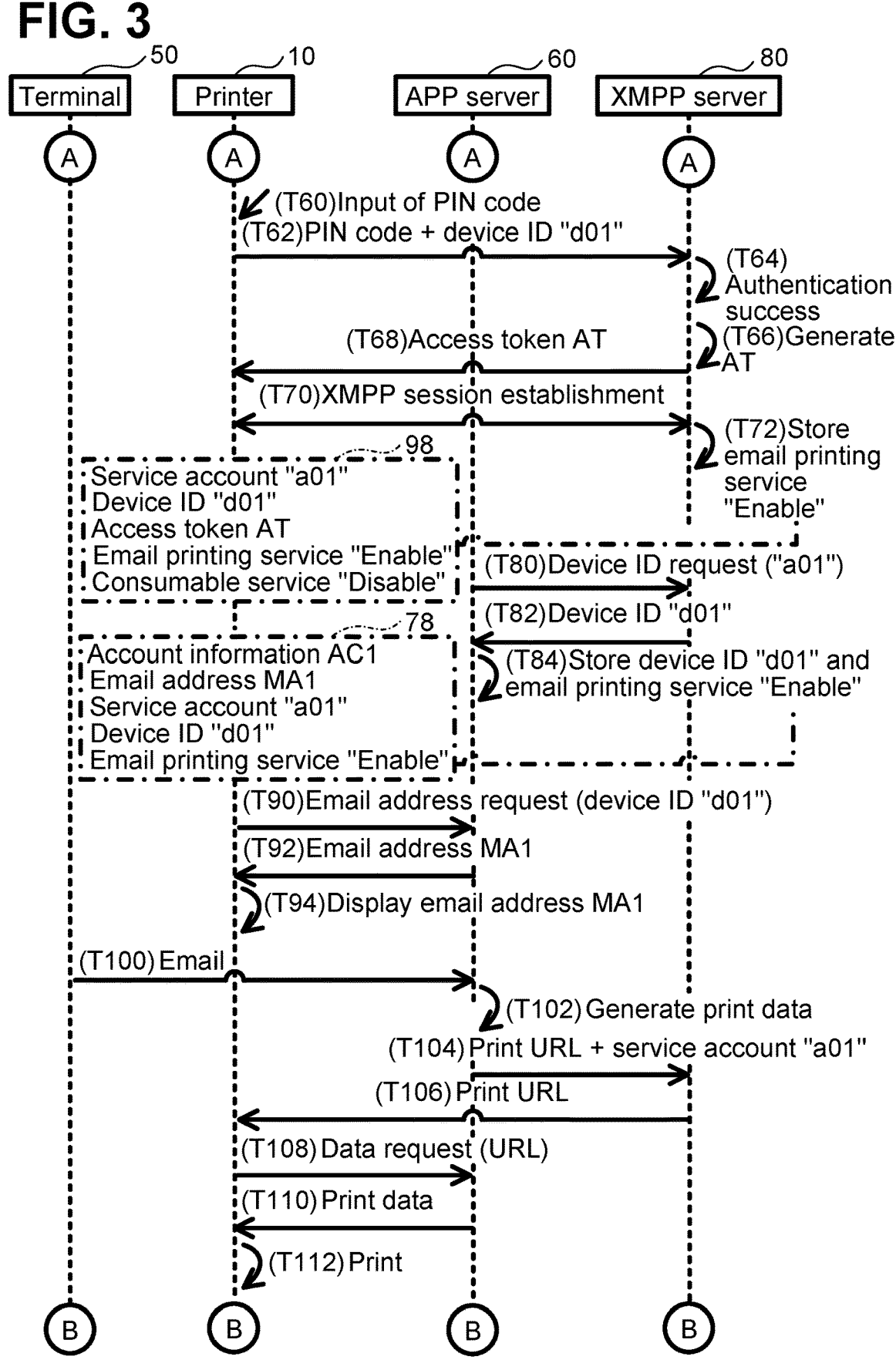
FIG. 3 is a sequence diagram continued from FIG. 2.

Email Printing Service Processing: FIGS. 2 and 3

With reference to FIGS. 2 and 3, a process for receiving the email printing service will be described. In the following description, the processing performed by a CPU of each device (for example, the CPU 32) is described as the processing performed by a device (for example, the printer 10) for ease of understanding. Communication performed by the devices is performed via communication I/Fs of the devices (for example, communication I/F 12 of the printer 10). Therefore, in the following description, when processing related to communication via a communication I/F is described, the phrase "via the communication I/F" is omitted.

In the initial state of FIG. 2, account information AC1 has already been registered at the APP server 60. The account information AC1 is thus stored in the model table 78. In the model table 78, an email address, a service account, and a device ID are not stored in association with the account information AC1, and "Disable" is stored as status information of the email printing service.

Upon receiving an input of the IP address of the printer 10 from the user at T10, the terminal 50 transmits an access request to the printer 10 at T12. As a result, the terminal 50 receives top screen data from the printer 10 at T14, and displays the top screen at T16. The top screen is a screen for changing various settings of the printer 10. The top screen includes setting items indicating the email printing service.

At T18, the user selects the email printing service and inputs account information AC1 to the terminal 50. In this case, the terminal 50 transmits an authentication Uniform Resource Locator (URL) request including the account information AC1 to the printer 10 in T20. The authentication URL request is thus transmitted from the printer 10 to the APP server 60. Here, the authentication URL request is a command for requesting the APP server 60 to transmit an authentication URL indicating the position of authentication screen data.

Upon receiving the authentication URL request from the printer 10 at T20, the APP server 60 determines that the account information AC1 included in the authentication URL request has been registered (i.e., determines that authentication has succeeded). As a result, a login state based on the account information AC1 is established. Next, at T22, the APP server 60 transmits a redirect request including the authentication URL to the printer 10. As a result, the redirect request is transmitted from the printer 10 to the terminal 50.

Upon receiving the redirect request from the printer 10 at T22, the terminal 50 transmits an access request including the authentication URL included in the redirect request to the APP server 60 at T24.

Upon receiving the access request from the terminal 50 at T24, the APP server 60 identifies the email printing service "Disable" associated with the account information AC1 from the model table 78. Next, at T26, the APP server 60 transmits the setting screen data indicating the identified "Disable" to the terminal 50.

Upon receiving the setting screen data from the APP server 60 at T26, the terminal 50 displays the setting screen represented by the setting screen data at T30. The setting screen includes a character string "Status: Disable" indicating that the email printing service is not currently provided to the printer 10 and a button B1 indicating a character string "Enable". The button B1 is a button for the user to start receiving email printing service. Upon receiving an operation of selecting the button B1 performed by the user at T32, the terminal 50 transmits a registration request to the APP server 60 at T34.

Upon receiving the registration request from the terminal 50 at T34, the APP server 60 generates an email address MA1 at T36 and stores the email address MA1 in the model table 78 in association with the account information AC1. Then, the APP server 60 transmits a PIN code and a service account request to the XMPP server 80 at T38.

Upon receiving the PIN code and the service account request from the APP server 60 at T38, the XMPP server 80 generates a PIN code and a service account "a01" at T40, and stores the service account "a01" in the service table 98. At this point, in the service table 98, the device ID and the access token are not stored in association with the service account "a01", and the email printing service "Disable" and the consumable service "Disable" are stored. Then, the XMPP server 80 transmits the PIN code and the service account "a01" to the APP server 60 at T42.

Upon receiving the PIN code and the service account "a01" from the XMPP server 80 at T42, the APP server 60 transmits the PIN code to the terminal 50 at T44. Next, at T50, the APP server 60 stores the service account "a01" in the model table 78 in association with the account information AC1.

Upon receiving the PIN code from the APP server 60 at T44, the terminal 50 displays a screen including a character string indicating the PIN code at T46. This allows the user to know the PIN code.

After storing the service account "a01" at T50, the APP server 60 periodically transmits a device ID request including the service account "a01" to the XMPP server 80 at T52. At this time point, the XMPP server 80 does not store the device ID in association with the service account "a01". Thus, the APP server 60 does not receive the device ID from the XMPP server 80.

After viewing the screen including the PIN code of the terminal 50, the user operates the printer 10 to input the PIN code to the printer 10. When the printer 10 receives the input of the PIN code from the user at T60, the printer 10 transmits the PIN code and the device ID "d01" identifying the printer 10 to the XMPP server 80 at T62.

The XMPP server 80 receives the PIN code and the device ID "d01" from the printer 10 at T62. As the received PIN code coincides with the PIN code generated at T40 in FIG. 2, the XMPP server 80 determines that authentication is successful at T64. In this case, the XMPP server 80 stores the device ID "d01" in the service table 98 in association with the service account "a01" generated at T40 together with the PIN code.

Next, at T66, the XMPP server 80 generates an access token AT and stores the access token AT in the service table 98 in association with the service account "a01" and the device ID "d01". The XMPP server 80 then transmits the access token AT to the printer 10 at T68.

Upon receiving the access token from the XMPP server 80 at T68, the printer 10 establishes an XMPP session with the XMPP server 80 using the access token AT at T70. The XMPP session is a continuous connection for the XMPP server 80 to perform server-push communication with the printer 10 over a firewall on the LAN 8 to which the printer 10 belongs.

When the establishment of the XMPP session at T70 ends, the XMPP server 80 stores the email printing service "Enable" in the service table 98 at T72 in association with the service account "a01", the device ID "d01", and the access token AT. Thereafter, when receiving the device ID request from the APP server 60 at T80, the XMPP server 80 determines that the device ID "d01" is stored in association with the service account "a01" included in the device ID request (refer to T64), and transmits the device ID "d01" to the APP server 60 at T82.

Upon receiving the device ID "d01" from the XMPP server 80 at T82, the APP server 60 stores the device ID "d01" and the email printing service "Enable" in association with the account information AC1, the email address MA1, and the service account "a01" at T84.

When the APP server 60 receives an email address request including the device ID "d01" from the printer 10 at T90, the APP server 60 transmits the email address MA1 (refer to T36 in FIG. 2) stored in association with the device ID "d01" to the printer 10 at When the printer 10 receives the email address MA1 from the APP server 60 at T92, the printer 10 displays the email address MA1 on the display 14 at T94. This allows the user to know the email address MA1.

Next, processing for performing email printing will be described. At T100, the terminal 50 transmits an email including the email address MA1 as a destination address to the APP server 60 in accordance with an instruction from the user. Image data representing an image to be printed is attached to the email.

Upon receiving the email from the terminal 50 at T100, the APP server 60 identifies status information of the email printing service associated with the email address MA1 included in the email from the model table 78. The APP server 60 performs processing at and after T102 for the identified status information indicating "Enable", and does not perform the processing at and after T102 for the identified status information indicating "Disable". At T102, the APP server 60 converts the image included in the email to generate print data having a print format that can be interpreted by the printer 10. Next, the APP server 60 identifies the service account "a01" stored in association with the email address MA1 included in the email from the model table 78. Then, at T104, the APP server 60 transmits the identified service account "a01" and the print URL to the XMPP server 80. Here, the print URL indicates a location in the APP server 60 where the print data is stored.

Upon receiving the service account "a01" and the print URL from the APP server 60 at T104, the XMPP server 80 transmits the print URL to the printer 10 at T106 by using the XMPP session (refer to T70) corresponding to the service account "a01".

Upon receiving the print URL from the XMPP server 80 at T106, the printer 10 transmits a data request including the print URL to the APP server 60 at T108.

Upon receiving the data request from the printer 10 at T108, the APP server 60 obtains the print data indicated by the print URL included in the data request. Then, the APP server 60 transmits the print data to the printer 10 at T110. As a result, the printer 10 prints the image represented by the print data at T112.

Figure 4:
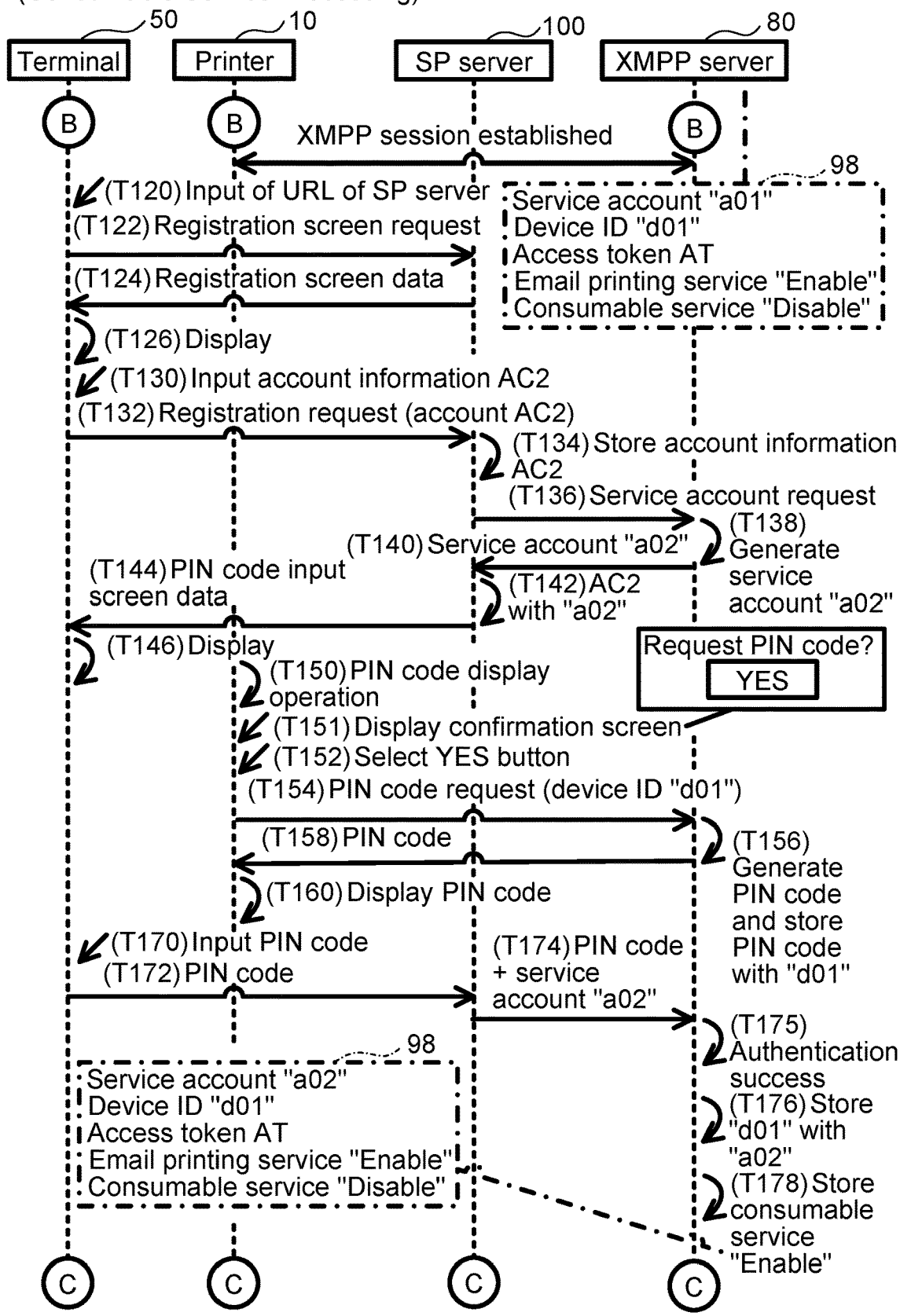
FIG. 4 is a sequence diagram of a process for receiving a consumable service.
Figure 5:
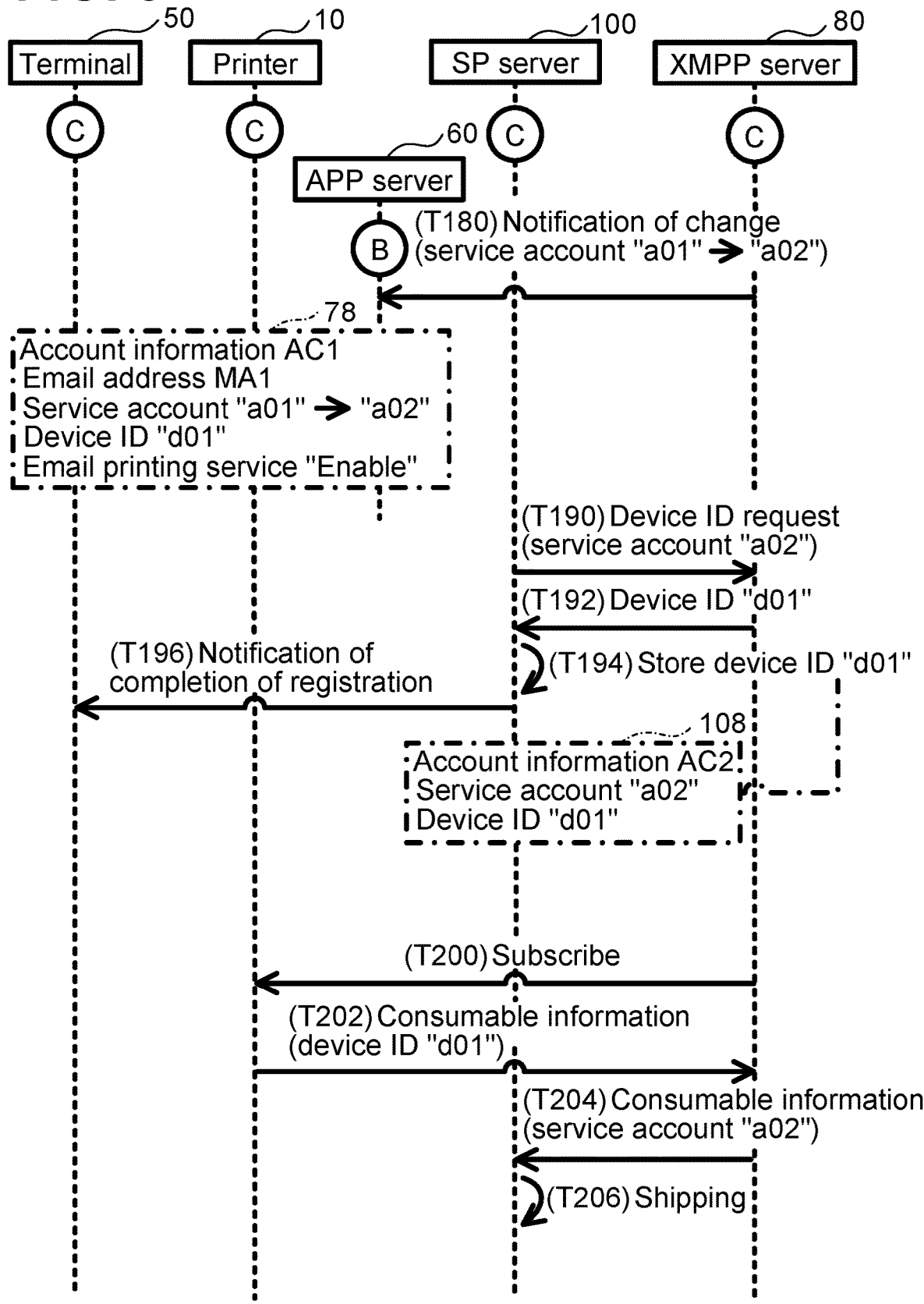
FIG. 5 is a sequence diagram continued from FIG. 4.

Consumable Service Processing: FIGS. 4 and 5

With reference to FIGS. 4 and 5, a process for receiving the consumable service will be described. The processing in FIG. 4 is started after the processing in FIGS. 2 and 3 are performed. Therefore, in the initial state of FIG. 4, the XMPP session is established between the printer 10 and the XMPP server 80 (refer to T70 in FIG. 3). In the service table 98 of the XMPP server 80, the device ID "d01", the access token AT, the email printing service "Enable", and the consumable service "Disable" are stored in association with the service account "a01".

Upon receiving an input of the URL of the SP server 100 from the user at T120, the terminal 50 transmits a registration screen request to the SP server 100 at T122.

Upon receiving the registration screen request from the terminal 50 at T122, the SP server 100 transmits registration screen data to the terminal 50 at T124.

Upon receiving the registration screen data from the SP server 100 at T124, the terminal 50 displays the registration screen at T126. Here, the registration screen is a screen for registering account information for receiving the consumable service. The user inputs account information AC2 at T130. The account information AC2 includes, for example, a user ID, a password, a name, an address, and credit card information. Next, at T132, the terminal 50 transmits a registration request including the account information AC2 to the SP server 100.

Upon receiving the registration request from the terminal 50 at T132, the SP server 100 stores the account information AC2 included in the registration request in the account table 108 at T134. At this point, a service account and a device ID are not stored in association with the account information AC2 in the account table 108. Then, the SP server 100 transmits a service account request to the XMPP server 80 at T136.

Upon receiving the service account request from the SP server 100 at T136, the XMPP server 80 generates a service account "a02" at T138. Then, the XMPP server 80 transmits the service account "a02" to the SP server 100 at T140.

Upon receiving the service account "a02" from the XMPP server 80 at T140, the SP server 100 stores the service account "a02" in association with the account information AC2 in the account table 108 at T142. Then, the SP server 100 transmits PIN code input screen data to the terminal 50 at T144. Thus, the terminal 50 displays a PIN code input screen at T146. Here, the PIN code input screen is a screen for receiving input of a PIN code from the user.

After viewing the PIN code input screen of the terminal 50, the user performs a PIN code display operation on the printer 10 at T150. In this case, the printer 10 displays a confirmation screen at T151. The confirmation screen is a screen for allowing the user to confirm permission of the PIN code issuance request to the XMPP server 80. Upon receiving an operation of selecting a YES button on the confirmation screen at T152, the printer 10 transmits a PIN code request including the device ID "d01" to the XMPP server 80 at T154.

Upon receiving the PIN code request from the printer 10 at T154, the XMPP server 80 generates a PIN code and stores the device ID "d01" included in the PIN code request in association with the PIN code at T156. Then, the XMPP server 80 transmits the PIN code to the printer 10 at T158.

Upon receiving the PIN code from the XMPP server 80 at T158, the printer 10 displays a screen including a character string indicating the PIN code on the display 14 at T160. This allows the user to know the PIN code.

After viewing the PIN code displayed on the printer 10, the user inputs the PIN code to a PIN code input screen (refer to T146) of the terminal 50 at T170. In this case, the terminal 50 transmits the PIN code to the SP server 100 at T172.

Upon receiving the PIN code from the terminal 50 at T172, the SP server 100 identifies the service account "a02" (refer to T142) stored in association with the account information AC2, and transmits the PIN code and the service account "a02" to the XMPP server 80 at T174.

The XMPP server 80 receives the PIN code and the service account "a02" from the SP server 100 at T174. As the received PIN code coincides with the PIN code generated at T156, the XMPP server 80 determines that authentication is successful at T175. In this case, the XMPP server 80 tries to store the device ID "d01" and the service account "a02", which have been stored in association with the PIN code at T156, in the service table 98. However, in the service table 98, the device ID "d01" is already stored in association with the service account "a01". Therefore, at T176, the XMPP server 80 changes the service account associated with the device ID "d01" from "a01" to "a02". That is, in the service table 98, the service account "a02", the device ID "d01", the access token AT, the email printing service "Enable", and the consumable service "Disable" are stored in association with each other. Next, at T178, the XMPP server 80 changes the consumable service associated with the service account "a02" from "Disable" to "Enable".

As illustrated in FIG. 5, the XMPP server 80 transmits a notification of change of service account to the APP server 60 at T180. The notification includes the service account "a01" before the change and the service account "a02" after the change.

Upon receiving the notification from the XMPP server 80 at T180, the APP server 60 stores the service account "a02" in association with the account information AC1 in the account table 78, instead of the service account "a01". This allows sharing of the service account "a02" among the APP server 60, the XMPP server 80, and the SP server 100.

The SP server 100 transmits a device ID request including the service account "a02" to the XMPP server 80 at T190.

Upon receiving the device ID request from the SP server 100 at T190, the XMPP server 80 identifies the device ID "d01" associated with the service account "a02" included in the device ID request from the service table 98. The XMPP server 80 transmits the device ID "d01" to the SP server 100 at T192.

Upon receiving the device ID "d01" from the XMPP server 80 at T192, the SP server 100 stores the device ID "d01" in association with the account information AC2 and the service account "a02" in the account table 108 at T194. Then, the SP server 100 transmits a notification of completion of registration to the terminal 50 at T196.

Next, processing for performing the automatic consumable shipping service will be described. In response to an instruction from the SP server 100, the XMPP server 80 transmits Subscribe to the printer 10 using the XMPP session at T200. Subscribe is a command for instructing a transmission timing of consumable information.

After transmitting Subscribe, the XMPP server 80 receives consumable information including remaining amount information indicating a remaining amount of the consumable and the device ID "d01" from the printer 10 at T202. In this case, the XMPP server 80 identifies the service account "a02" associated with the device ID "d01" included in the consumable information from the service table 98. Then, the XMPP server 80 transmits the consumable information including the service account "a02" to the SP server 100 at T204.

Upon receiving the consumable information from the XMPP server 80 at T204, the SP server 100 determines that the remaining amount indicated by the remaining amount information in the consumable information is less than a predetermined threshold at T206, and identifies the account information AC2 associated with the service account "a02" in the consumable information from the account table 108. Next, the SP server 100 uses the identified account information AC2 to perform shipping processing for shipping a new consumable item to the user.

Figure 6:
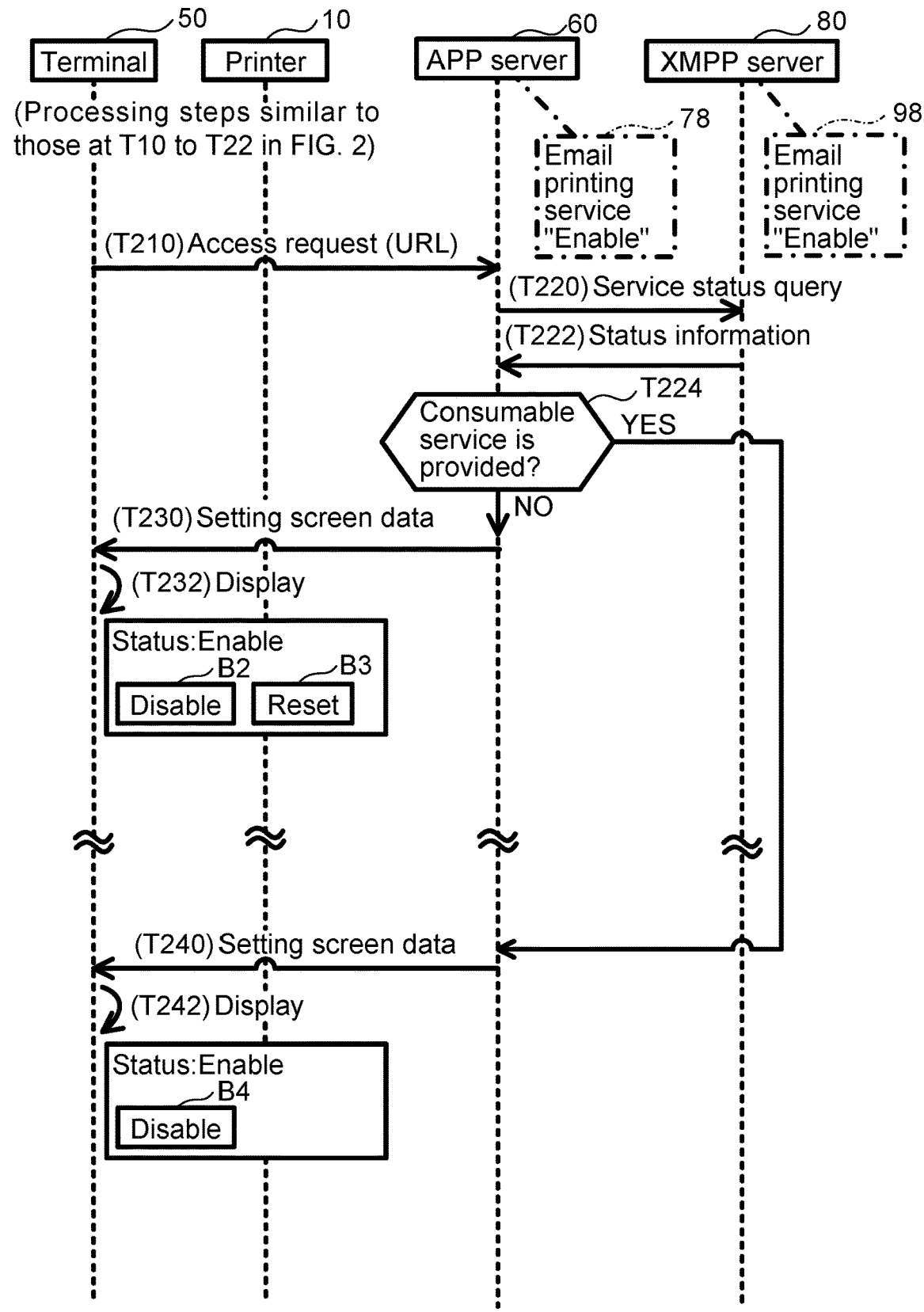
FIG. 6 is a sequence diagram of a process for transmitting setting screen data to a terminal.

Display of Setting Screen Using Terminal 50: FIG. 6

With reference to FIG. 6, a process for changing settings related to the email printing service using the terminal 50 will be described. The initial state of FIG. 6 is a state after at least the processing of FIGS. 2 and 3 are performed. That is, in the APP server 60 and the XMPP server 80, the email printing service "Enable" is stored in association with the device ID "d01" (refer to T72 and T84 in FIG. 3).

A sequence of processing steps similar to those at T10 to T22 in FIG. 2 is performed. As a result, a login state based on the account information AC1 is established in the APP server 60. Thereafter, upon receiving an access request including an authentication URL from the terminal 50 at T210, the APP server 60 identifies service account information associated with the logged-in account information AC1 with which from the model table 78. When the process of FIG. 6 is performed before the processes of FIGS. 4 and 5, the service account "a01" is stored in association with the account information AC1 in the model table 78 of the APP server 60 (refer to T84 in FIG. 3). In this case, the APP server 60 identifies the service account "a01." When the process of FIG. 6 is performed after the processes of FIGS. 4 and 5, the service account "a02" is stored in association with the account information AC1 in the model table 78 of the APP server 60 (refer to T180 in FIG. 5). In this case, the APP server 60 identifies the service account "a02." The APP server 60 transmits a service status query including the identified service account "a01" or "a02" to the XMPP server 80 at T220.

Upon receiving the service status query from the APP server 60 at T220, the XMPP server 80 identifies status information of each service associated with the service account included in the service status query from the service table 98. Specifically, the XMPP server 80 identifies the email printing service "Enable". When the process of FIG. 6 is performed after the processes of FIGS. 4 and 5, the XMPP server 80 identifies the consumable service "Enable". When the process of FIG. 6 is performed before the processes of FIGS. 4 and 5, the XMPP server 80 identifies the consumable service "Disable". The XMPP server 80 then transmits the identified status information of each service to the APP server 60 at T222.

Upon receiving the status information of each service from the XMPP server 80 at T222, the APP server 60 determines whether the consumable service is provided at T224. When the received status information of the consumable service indicates "Disable", the APP server 60 determines that the consumable service is not currently provided at T244 (NO in T224), and the process proceeds to T230. When the received status information of the consumable service indicates "Enable", the APP server 60 determines that the consumable service is currently provided at T244 (YES in T224), and the process proceeds to T240.

The APP server 60 transmits setting screen data indicating a first setting screen to the terminal 50 at T230. The terminal 50 thus displays the first setting screen at T232. The first setting screen includes a character string "Status: Enable" indicating that the email printing service is currently provided, a button B2 indicating a character string "Disable", and a button B3 indicating a character string "Reset". Here, the button B2 is a button for requesting to stop the email printing service without disconnecting the XMPP session. The button B3 is a button for disconnecting the XMPP session.

The APP server 60 transmits setting screen data indicating a second setting screen to the terminal 50 at T240. The terminal 50 thus displays the second setting screen at T242. The second setting screen includes a character string "Status: Enable" indicating that the email printing service is currently provided, and a button B4 indicating a character string "Disable". The button B4 is the same button as the button B2. The second setting screen does not include the button B3. As described above, when determining that the consumable service is currently provided (YES in T224), the APP server 60 can cause the terminal 50 to display the second setting screen that does not include the button B3 for disconnecting the XMPP session. For this reason, the APP server 60 can prevent server-push communication related to the consumable service (for example, transmission of Subscribe) from becoming impracticable due to disconnection of the XMPP session against the user's intention.

The APP server 60 can display, on the terminal 50, each setting screen including the button B2 or B4 for requesting to stop the email printing service without disconnecting the XMPP session, regardless of whether the consumable service is currently provided. The user thus can request the APP server 60 to stop the email printing service.

Figure 7:
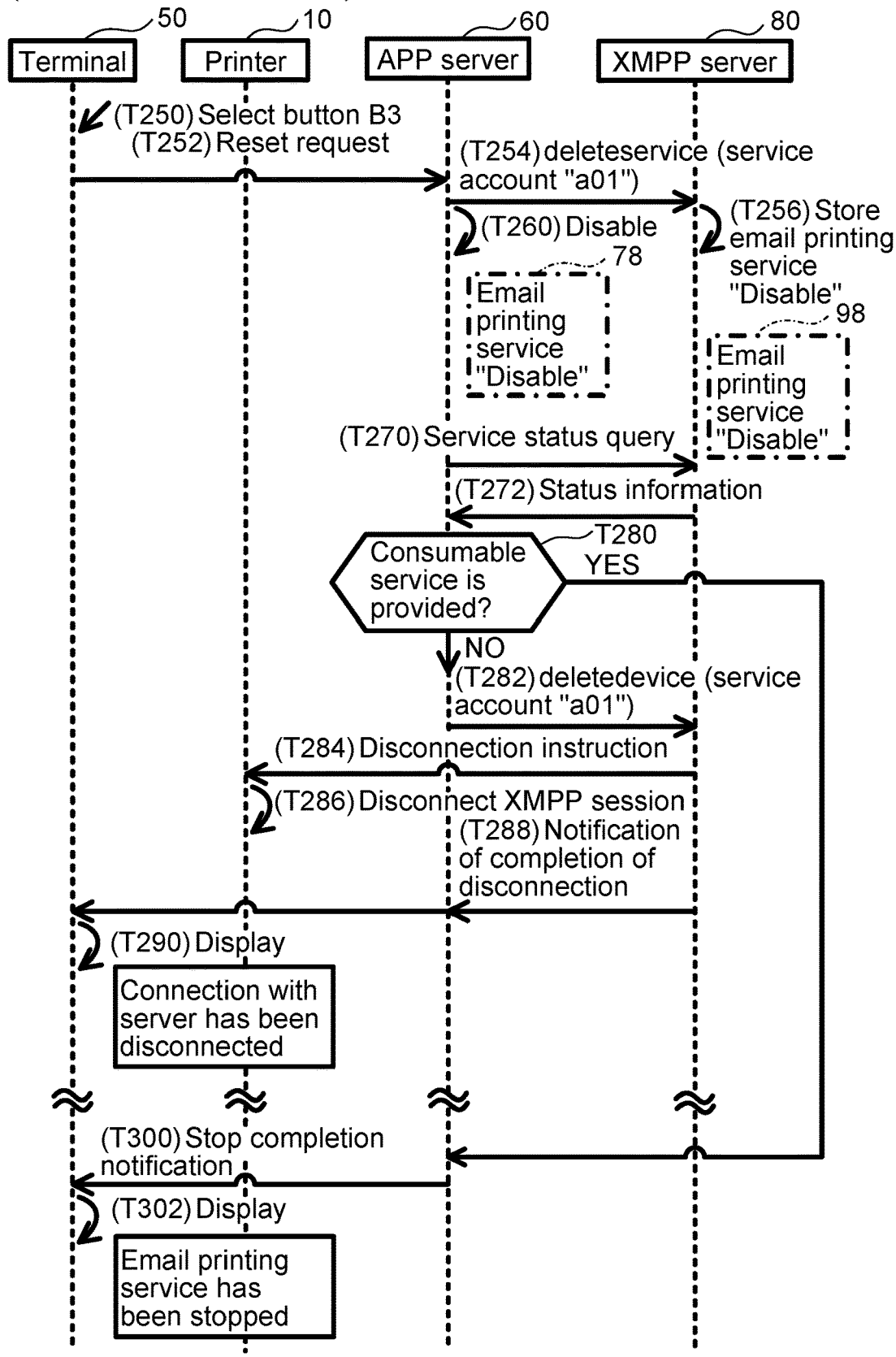
FIG. 7 is a sequence diagram in a case where a button B3 is selected.
Figure 8:
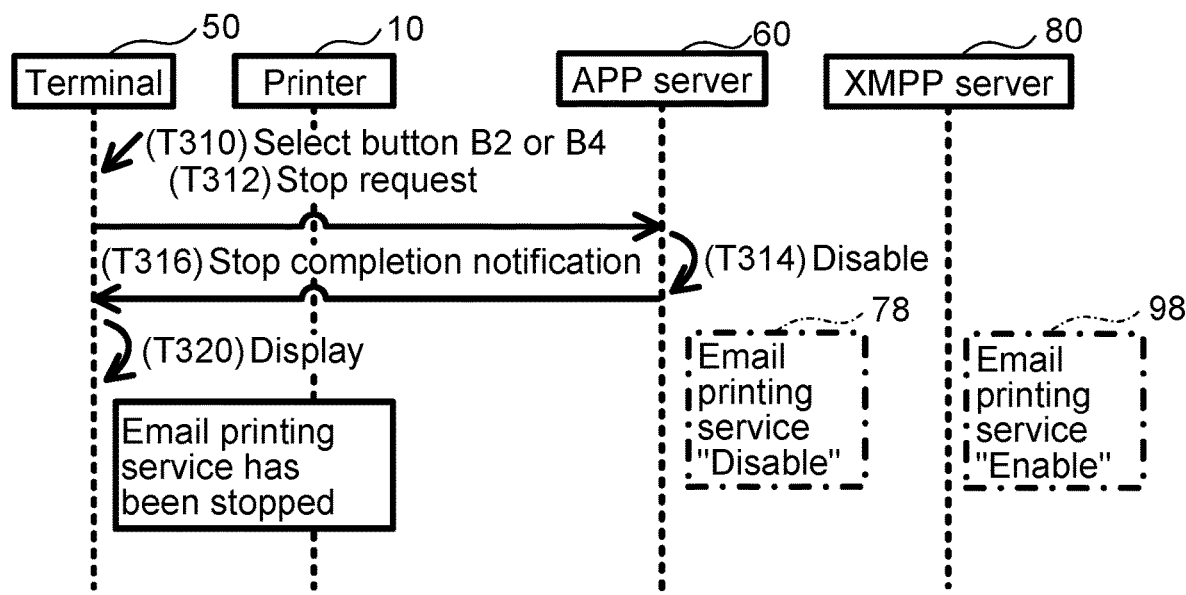
FIG. 8 is a sequence diagram in a case where a button B2 or B4 is selected.

Specific Case: FIGS. 7 and 8

With reference to FIGS. 7 and 8, a specific case performed after the process of FIG. 6 will be described First, with reference to FIG. 7, a process in a case where the button B3 in the first setting screen displayed at T232 in FIG. 6 is selected will be described. Next, with reference to FIG. 8, a description will be given of a process in a case where the button B2 in the first setting screen displayed at T232 is selected or a case where the button B4 in the second setting screen displayed at T242 is selected.

For Selection of Button B3: FIG. 7

Upon receiving an operation of selecting the button B3 on the first setting screen performed by the user at T250, the terminal 50 transmits a reset request to the APP server 60 at T252. In this embodiment, since the login to the APP server 60 has already been performed using the account information AC1 (refer to T20 in FIG. 2), the reset request does not include the account information AC1. In a modification, however, the reset request may include the account information AC1. In another modification, the reset request may include the device ID "d01". In this case, the device ID "d01" is transmitted from the printer 10 to the APP server 60 at T20 in FIG. 2, and signals then transmitted from the APP server 60 to the terminal 50 each include the device ID "d01". The terminal 50 can thus transmit the reset request including the device ID "d01".

As described above, the first setting screen being displayed on the terminal 50 means that the process of FIG. 6 has been performed before the processes of FIGS. 4 and 5. In this case, in the model table 78 of the APP server 60, the service account "a01" is stored in association with the account information AC1 (refer to T84 in FIG. 3). Upon receiving the reset request from the terminal 50 at T252, the APP server 60 identifies the service account "a01" associated with the logged-in account information AC1 from the model table 78. The APP server 60 then transmits a deleteservice signal including the service account "a01" to the XMPP server 80 at T254. This signal is a signal requesting to change the status information of the email printing service from "Enable" to "Disable". In a modification, the signal may include the device ID "d01" instead of the service account "a01". That is, the signal includes information for identifying a target service.

Upon receiving the deleteservice signal at T254, the XMPP server 80 changes the status information of the email printing service stored in the service table 98 in association with the service account "a01" from "Enable" to "Disable" at T256. In response to the communication of the deleteservice signal, the status information of the email printing service to be stored in the XMPP server 80 can be appropriately changed to "Disable".

At T260, the APP server 60 changes the status information of the email printing service stored in the model table 78 in association with the service account "a01" (that is, the account information AC1) from "Enable" to "Disable". This enables the APP server 60 to stop providing the email printing service without disconnecting the XMPP session.

A sequence of processing steps at T270 to T280 is similar to that at T220 to T224 in FIG. 6. The processing at T270 to T280 is performed to recheck the status information of each service. If the result of T280 is NO, the process proceeds to T282, if YES, the process proceeds to T300.

The APP server 60 transmits a deletedevice signal including the service account "a01" to the XMPP server 80 at T282. This signal is a signal to request to disconnect the XMPP session with the printer 10 identified by the device ID "d01" associated with the service account "a01".

Upon receiving the deletedevice signal from the APP server 60 at T282, the XMPP server 80 transmits an instruction to disconnect the XMPP session to the printer 10 using the XMPP session at T284. The printer 10 thus disconnects the XMPP session at T286. As a result, the XMPP session between the XMPP server 80 and the printer 10 is disconnected. This is because the provision of all the services related to the printer 10 is stopped, and thus the server-push communication with the printer 10 is unnecessary. The load of communication between the printer 10 and the XMPP server 80 is thus lightened, and the processing load of each of the printer 10 and the XMPP server 80 is lightened. The XMPP server 80 may delete information associated with the printer 10 (i.e., the device ID "d01") from the service table 98 (refer to T72 in FIG. 3) when the XMPP session is disconnected.

The XMPP server 80 then transmits a notification of completion of disconnection to the APP server 60 at T288.

Upon receiving the notification of completion of disconnection from the XMPP server 80 at T288, the APP server 60 transmits the notification to the terminal 50. The terminal 50 thus displays a disconnection completion screen at T290. The disconnection completion screen includes a message indicating that the XMPP session with the XMPP server 80 has been disconnected.

After the processing at T288, the terminal 50 receives setting screen data from the APP server 60 similarly to T26 in FIG. 2, and displays the same setting screen as that at T30. When the user performs an operation of selecting the button B1 indicating the character string "Enable" in the setting screen, the processes at and after T32 are performed again.

In response to determining that the consumable service is currently provided at T280 (YES at T280), the APP server 60 transmits a stop completion notification to the terminal 50 at T300 without disconnecting the XMPP session. The terminal 50 thus displays a stop completion screen at T302. The stop completion screen includes a message indicating that the email printing service has been stopped.

After the processing at T302, the terminal 50 receives setting screen data from the APP server 60 similarly to T26 in FIG. 2, and displays a setting screen similar to that at T30. Upon receiving an operation of selecting a button indicating the character string "Enable" in the setting screen, the terminal 50 transmits an enablement request to the APP server 60. This request is a signal requesting to change the status information of the email printing service from "Disable" to "Enable". Upon receiving the enablement request from the terminal 50, the APP server 60 changes the status information of the email printing service associated with the logged-in account information AC1 (refer to T20 in FIG. 2) from "Disable" to "Enable" in the model table 78. The APP server 60 identifies the service account "a01" associated with the logged-in account information AC1 from the model table 78. The APP server 60 then transmits the enablement request including the identified service account "a01" to the XMPP server 80. Upon receiving the enablement request from the APP server 60, the XMPP server 80 changes the status information of the email printing service stored in the service table 98 in association with the service account "a01" from "Disable" to "Enable".

For Selection of Button B2 or B4: FIG. 8

As illustrated in FIG. 8, upon receiving an operation of selecting the button B2 on the first setting screen or the button B4 on the second setting screen performed by the user at T310, the terminal 50 transmits a stop request at T312. In this embodiment, since the login to the APP server 60 has already been performed using the account information AC1 (refer to T20 in FIG. 2), the stop request does not include the account information AC1. In a modification, however, the stop request may include the account information AC1 or the device ID "d01".

Upon receiving the stop request from the terminal 50 at T312, the APP server 60 changes the status information of the email printing service stored in the model table 78 in association with the account information AC1 from "Enable" to "Disable" at T314. This enables the APP server 60 to stop providing the email printing service without disconnecting the XMPP session. The user can be continuously provided with a service other than the email printing service.

The APP server 60 then transmits a stop completion notification to the terminal 50 at T316. The terminal 50 thus displays a stop completion screen at T320. The stop completion screen includes a message indicating that the provision of the email printing service is stopped.

Here, in the processing of FIG. 8, the APP server 60 does not transmit the deleteservice signal to the XMPP server 80. Therefore, in the service table 98 of the XMPP server 80, the email printing service "Enable" is maintained. This enables simplification of the processing related to the provision of the email printing service when the user desires to resume the provision of the email printing service. Specifically, when a registration request is transmitted to the APP server 60 at T32 in response to the user selecting the button B1 at T34 in FIG. 2, the status information of the email printing service associated with the account information AC1 is changed from "Disable" to "Enable" in the model table 78 of the APP server 60. In this case, the user can be provided with the email printing service even if the processes at T36 in FIGS. 2 to T94 in FIG. 3 are not performed.

After the processing at T320, the terminal 50 receives setting screen data from the APP server 60 similarly to T26 in FIG. 2, and displays the same setting screen as that at T30. Upon receiving an operation of selecting a button indicating the character string "Enable" in the setting screen, the terminal 50 transmits an enablement request to the APP server 60. Upon receiving the enablement request from the terminal 50, the APP server 60 changes the status information of the email printing service associated with the logged-in account information AC1 (refer to T20 in FIG. 2) from "Disable" to "Enable" in the model table 78.

Figure 9:
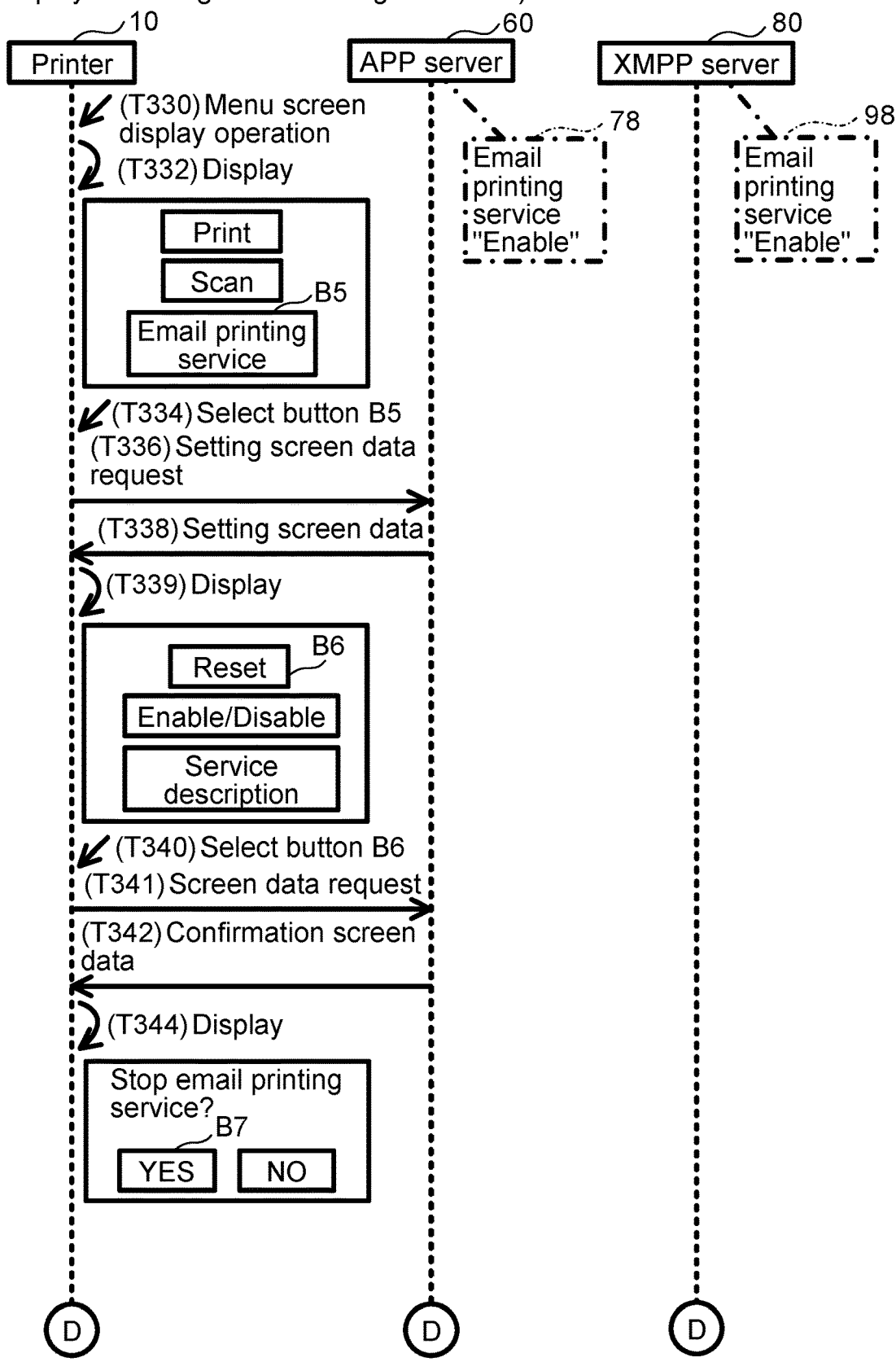
FIG. 9 is a sequence diagram of a process for transmitting setting screen data to a printer.

Display of Setting Screen Using Terminal 10: FIGS. 9 and 10

With reference to FIG. 9, a process for changing settings related to the email printing service using the printer 10 will be described. The initial state of FIG. 9 is a state after at least the processing of FIGS. 2 and 3 are performed.

Upon receiving an operation of displaying a menu screen performed by the user at T330, the printer 10 displays a menu screen at T332. The menu screen includes a print button for causing the printer 10 to perform printing, a scan button for causing the printer 10 to perform scanning, and an Email printing service button B5 for displaying a screen related to an email print service. Upon receiving an operation of selecting the Email printing service button B5 performed by the user at T334, the printer 10 transmits a setting screen data request to the APP server 60 at T336.

The APP server 60 receives the setting screen data request from the printer 10 at T336. The APP server 60 then transmits setting screen data to the printer 10 at T338, regardless of whether the consumable service is currently provided.

Upon receiving the setting screen data from the APP server 60 at T338, the printer 10 displays a third setting screen at T339. The third setting screen includes a button B6 indicating a character string "reset", an Enable/Disable button, and a Service description button. The button B6 is a button for disconnecting the XMPP session. The Enable/Disable button is a button for requesting a change of the status of providing the email printing service. The Enable/Disable button is a button for requesting a change to the disabled state when the email printing service is currently in the enabled state, and requesting a change to the enabled state when the email printing service is currently in the disabled state. The Service description button is a button for requesting display of a screen describing the service content of the email printing service.

Here, as described with reference to FIG. 6, to change the setting related to the email printing service using the terminal 50, the APP server 60 causes the terminal 50 to display a first setting screen (refer to T232 in FIG. 6) including the button B3 (i.e., the Reset button) or a second setting screen (refer to T242) not including the button B3 (i.e., the Reset button) in accordance with a status of providing the consumable service. If the presence or absence of the display of the Reset button is changed in accordance with the status of providing the consumable service when the setting related to the email printing service is changed using the printer 10, the user needs to distinguish between a screen on which the Reset button is not displayed and a screen on which the Reset button is displayed in the printer 10. However, the display of the printer 10 is smaller than that of the terminal 50 and has relatively low visibility. Therefore, in the printer 10, the user may not be able to distinguish between a screen without the Reset button and a screen with the Reset button. To avoid this when the printer 10 is used to change settings related to the email printing service, a third setting screen including the button B6 (that is, the Reset button) is displayed on the printer 10 regardless of whether the consumable service is currently provided (refer to T339 in FIG. 9). The user thus does not need to distinguish whether the Reset button is displayed. Therefore, the visibility of the screen displayed on the printer 10 is relatively improved.

Upon receiving an operation of selecting the button B6 on the third setting screen performed by the user at T340, the printer 10 transmits a screen data request to the APP server 60 at T341.

Upon receiving the screen data request from the printer 10 at T341, the APP server 60 transmits confirmation screen data to the printer 10 at T342. The printer 10 thus displays a confirmation screen at T344. The confirmation screen is a screen for prompting the user to confirm whether to stop receiving the email printing service. Upon receiving an operation of selecting a button B7 (that is, the YES button) on the confirmation screen at T344, the printer 10 transmits a stop request including the device ID "d01" to the APP server 60 at T348.

Upon receiving the stop request from the printer 10 at T348, the APP server 60 identifies the service account "a01" or "a02" associated with the device ID "d01" included in the stop request from the model table 78. The APP server 60 transmits a service status query including the identified service account to the XMPP server 80 at T350. A sequence of processing steps at T352 and T354 is similar to that at T222 and T224 in FIG. 6. If the result of T354 is NO, the process proceeds to T360, if YES, the process proceeds to T380.

The APP server 60 transmits a deletedevice signal including the service account "a01" and a deleteservice signal including the service account "a01" to the XMPP server 80 at T360. The deletedevice signal is a signal requesting to change the status information of the email printing service from "Enable" to "Disable". The deletedevice signal is a signal requesting to disconnect the XMPP session with the printer 10 identified by the device ID "d01" associated with the service account "a01".

At T362, the APP server 60 changes the status information of the email printing service stored in the model table 78 in association with the service account "a01" (that is, the device ID "d01") from "Enable" to "Disable". This enables the APP server 60 to stop providing the email printing service without disconnecting the XMPP session.

Upon receiving the deleteservice signal and the deletedevice signal from the APP server 60 at T360, the XMPP server 80 changes the status information of the email printing service stored in the service table 98 in association with the service account "a01" from "Enable" to "Disable" in accordance with the deleteservice signal at T364. The XMPP server 80 transmits an instruction to disconnect the XMPP session to the printer 10 by using the XMPP session in accordance with the deletedevice signal at T366. The XMPP session is thus disconnected at T368. The load of communication between the printer 10 and the XMPP server 80 is thus lightened, and the processing load of each of the printer 10 and the XMPP server 80 is lightened.

The APP server 60 then transmits disconnection completion screen data to the printer 10 at T370. The printer 10 thus displays a disconnection completion screen at T372. The disconnection completion screen includes a message indicating that the XMPP session with the XMPP server 80 has been disconnected.

Upon determining that the consumable service is currently provided at T354 (YES at t354), the APP server 60 changes the status information of the email printing service stored in the model table 78 in association with the service account "a02" (that is, the device ID "d01") from "Enable" to "Disable" at T380. This enables the APP server 60 to stop providing the email printing service without disconnecting the XMPP session. The user can be continuously provided with the consumable service.

The APP server 60 then transmits stop completion screen data to the printer 10 at T382. The printer 10 thus displays a stop completion screen at T384. The stop completion screen includes a message indicating that the email printing service has been stopped and the consumable service is continuously provided.

Here, the APP server 60 does not transmit the deleteservice signal to the XMPP server 80 when determining YES at T354. Therefore, in the service table 98 of the XMPP server 80, the email printing service "Enable" is maintained. This enables simplification of the processing related to the provision of the email printing service when the user desires to resume the provision of the email printing service.

In a modification, the APP server 60 may transmit the deleteservice signal to the XMPP server 80 after the processing at T380. In this case, the email printing service "Disable" is stored in the service table 98 of the XMPP server 80 instead of "Enable". In this modification, the status information of the email printing service is shared between the APP server 60 and the XMPP server 80.

Correspondence Relationship

A combination of the APP server 60 and the XMPP server 80 is an example of a "server". The APP server 60 is an example of a "first server", and the XMPP server 80 is an example of a "second server". The printer 10 is an example of a communication device, and the terminal 50 is an example of an external device. The email printing service is an example of a "first type of service", and the automatic consumable shipping service is an example of a "second type of service". The registration request at T34 in FIG. 2 is an example of a first instruction, and the registration request at T132 in FIG. 4 is an example of a second instruction. The XMPP session is an example of a "continuous connection". The processing at T106 in FIG. 3 is an example of "server-push communication related to provision of the first type of service", and the processing at T200 in FIG. 5 is an example of "server-push communication related to provision of the second type of service". The access request at T210 in FIG. 6 is an example of a first transmission request, and the setting screen data request at T336 in FIG. 9 is an example of a second transmission request. The memory 94 is an example of "memory", and the service table 98 is an example of "list". The status information of the email printing service in the memory 94 is an example of "first status information", and the status information of the automatic consumable shipping service is an example of "second status information". The setting screen data at T230 in FIG. 6 is an example of "first screen data", the setting screen data at T240 is an example of "second screen data", and the setting screen data at T338 in FIG. 9 is an example of "third screen data". The button B3 is an example of a "disconnection button". The button indicating the character string "Disable" (that is, the button B2 and the button B4) is an example of a "first stop button", and the button B5 is an example of a "second stop button". The deleteservice signal is an example of a "stop request", and the deletedevice signal is an example of s "disconnection request". Enable is an example of "information indicating that the first type of service is provided", and Disable is an example of "information indicating that the first type of service is not provided".

The processing at T70 in FIG. 3 is an example of processing performed by a "connection establisher". The processing at T210 in FIG. 6 is an example of processing performed by a "first transmission request receiver", and the processing at T336 in FIG. 9 is an example of processing performed by a "second transmission request receiver". The processing at T224 in FIG. 6 is an example of processing performed by a first determiner, the processing at T354 in FIG. 9 is an example of processing performed by a second determiner. The processing at T230 in FIG. 6 is an example of processing performed by a "first screen data transmitter", the processing at T240 is an example of processing performed by a "second screen data transmitter", and the processing at T338 in FIG. 9 is an example of processing performed by a "third screen data transmitter". The processing at T284 in FIG. 7 is an example of processing performed by a first disconnector, and the processing at T366 in FIG. 10 is an example of processing performed by a second disconnector. The processing at T314 in FIG. 8 is an example of processing performed by a "first stop processing executor", the processing at T380 in FIG. 10 is an example of processing performed by a "second stop processing executor". The processing at T254 in FIG. 7 is an example of processing performed by a "stop request transmitter". The processing at T256 in FIG. 7 is an example of processing performed by a "changer". The processing at T282 in FIG. 7 is an example of processing performed by a "disconnection request transmitter".

Although specific examples of the disclosure have been described in detail above, these are merely examples and do not limit the scope of the claims. The technology described in the claims includes various modifications and changes of the specific examples illustrated above. Modifications of the above embodiment are enumerated below.

In a first modification, when the APP server 60 receives a setting screen data request from the printer 10 at T336 in FIG. 9, the APP server 60 may determine whether a consumable service is currently provided. The APP server 60 may transmit the setting screen data of T230 in FIG. 6 to the printer 10 in response to determining that the consumable service is not currently being provided, and transmit the setting screen of T240 to the printer 10 in response to determining that the consumable service is currently being provided. In this modification, the printer 10 is an example of an "external device", the setting screen data request is an example of a "first transmission request", the setting screen data of T230 is an example of "first screen data", and the setting screen data of T240 is an example of "second screen data". In particular, in this modification, the "external device" and the "communication device" are the same device.

In a second modification, the APP server 60 may transmit, to the terminal 50, setting screen data indicating a setting screen that does not include the button B2 at T230 in FIG. 6. The APP server 60 may transmit, to the terminal 50, setting screen data indicating a setting screen that does not include the button B4 at T240. Generally speaking, each of the "first setting screen" and the "second setting screen" may not include the "first stop button". In this modification, the "first stop processing executor" can be omitted.

In a third modification, the printer 10 may not perform the operation of T336 in FIG. 9. That is, the process of FIG. 9 may not be performed. In this modification, the "second transmission request receiver", the "third screen data transmitter", the "second determiner", the "second disconnector", and the "second stop processing executor" can be omitted.

In a fourth modification, when the APP server 60 receives a setting screen data request from the printer 10 at T336 in FIG. 9, the APP server 60 may determine whether a consumable service is currently provided. The APP server 60 may transmit setting screen data including the Reset button to the printer 10 in response to determining that the consumable service is not currently being provided, and transmit setting screen not including the Reset button to the printer 10 in response to determining that the consumable service is currently being provided. Generally speaking, when the second transmission request is received from the communication device, the "server" may change screen data to be transmitted to the communication device depending on whether the second type of service is provided to the user.

In a fifth modification 5, the APP server 60 and the XMPP server 80 may be achieved with a single server. In this modification, the "first server" may not include the "stop request transmitter", the "disconnection request transmitter", and the "first stop processing executor", and the "second server" may not include the "changer". In another modification, the "server" may be constituted by three or more servers.

In a sixth modification, the APP server 60 may transmit the deleteservice signal to the XMPP server 80 when the button B2 or B4 is selected at T310 in FIG. 8. In this modification, the email printing service "Disable" is stored in the service table 98 of the XMPP server 80 instead of "Enable". Generally speaking, the "first stop processing executor" of the "first server" may transmit a "stop request" to the second server.

In a seventh modification, the "first type of service" is not limited to the email printing service, and may be another type of service. For example, the other type of service may be an information collection service that collects information of a printer and provides the information to a printer administrator. For example, the other type of service may be a remote printing service that receives image data from a terminal without using email and transmits print data to a printer. For example, the other type of service may be an automatic consumables shipping service. Further, generally speaking, the "first type of service" may be a service provided by using the "first server". The "second type of service" is not limited to the automatic consumables shipping service, and may be another type of service. For example, the other type of service may be a charging service that charges the user an amount of money corresponding to the number of print media used in the printer 10. For example, the other types of services may be an email printing service, a remote printing service, an information collecting service, or another service. Further, generally speaking, the "second type of service" may be a service provided without using the "first server".

In an eighth modification, at T18 in FIG. 2 cited in FIG. 6, the user may only select the email printing service. That is, the user can skip the input of the account information AC1. In this modification, at T20, the terminal 50 transmits an authentication URL request to the printer 10, and the printer 10 transmits an authentication URL request including the device ID "d01" to the APP server 60. In this case, the APP server 60 transmits a URL including the device ID "d01" to the terminal 50 at T22, and receives an access request including the URL from the terminal 50 at T210 in FIG. 6. The APP server 60 transmits a service status query including the device ID "d01" to the XMPP server 80 at T220.

In a ninth modification, the "communication device" may not be the printer 10, but may be another device such as a scanner, a multifunction peripheral, a mobile terminal, a PC, or a server.

In a tenth modification, at least one of the processes in FIGS. 2 to 10 performed using software in the embodiment described above may be performed using hardware such as a logic circuit.

The technical elements described in this specification or the drawings each exhibit technical effects separately or in combination, and combinations of the elements are not limited to those described in the claims as filed. The techniques illustrated in the specification or the drawings may achieve a plurality of purposes at a time, and achieving one of the purposes may produce technical effects.

What is claimed is:

1. A server, comprising:
    a memory;
    a connection establisher configured to establish a continuous connection with a communication device in response to a first instruction being received from an external device and configured to not establish a new continuous connection with the communication device in response to a second instruction being received from the external device in the continuous connection established with the communication device, the first instruction indicating a start to provide a first type of service related to a communication device, the second instruction indicating a start to provide a second type of service related to the communication device, the continuous connection being used to perform server-push communication with the communication device;

a first determiner configured to, in response to a service stop request being received from the external device, determine whether the second type of service related to the communication device is currently provided, using status information indicating a status of providing service stored in the memory;

a first screen data transmitter configured to transmit first screen data for displaying a first setting screen to the external device in response to the first determiner determining that the second type of service is not currently provided, the first setting screen including a disconnection button to disconnect the continuous connection; and a second screen data transmitter configured to transmit second screen data for displaying a second setting screen to the external device in response to the first determiner determining that the second type of service is currently provided, the second setting screen not including the disconnection button.

2. The server according to claim 1, further comprising a first disconnector configured to disconnect the continuous connection in response to selection of the disconnection button included in the first setting screen displayed on the external device.

3. The server according to claim 2,
wherein the server includes a first server and a second server different from the first server,
wherein the first server includes a service stop request receiver, the first determiner, the first screen data transmitter, and the second screen transmitter, and
wherein the second server includes the memory, the connection establisher, and the first disconnector.

4. The server according to claim 3,
wherein the first server further includes a stop request transmitter configured to transmit a stop request to the second server in response to selection of the disconnection button included in the first setting screen at the external device, and
wherein the second server further includes a changer configured to change the status information stored in the memory from information indicating that the first type of service is provided to information indicating that the first type of service is not provided.

5. The server according to claim 4,
wherein the first server further includes a disconnection request transmitter configured to transmit a disconnection request to the second server in response to selection of the disconnection button included in the first setting screen at the external device, and
wherein the first disconnector of the second server is configured to disconnect the continuous connection by transmitting an instruction to disconnect the continuous connection to the communication device in response to the disconnection request being received from the first server.

6. The server according to claim 5,
wherein the first setting screen further includes a first stop button for stopping providing the first type service,
wherein the second setting screen includes the first stop button,
wherein the server further comprises a first stop processing executor configured to perform a first stop process for stopping providing the first type of service related to the communication device without transmitting the stop request to the second server, in response to selection of the first stop button included in the first setting screen or the second setting screen displayed on the external device.

7. The server according to claim 1,
wherein the first type of service is a service whose provision is stopped by the server, and
wherein the second type of service is a service whose provision is not stopped by the server.

8. The server according to claim 1,
wherein the communication device includes a printer,
wherein the first type of service is a service in which, in response to receiving an image data, the server transmits print data, obtained by using the image data, to the printer, and
wherein the second type of service is a service in which a consumable to be used by the printer is shipped.

9. A non-transitory computer readable storage medium storing a computer program for a server including memory and a computer, the computer program comprising instructions that, when executed, cause the computer to function as:

a connection establisher configured to establish a continuous connection with a communication device in response to a first instruction being received from an external device and configured to not establish a new continuous connection with the communication device in response to a second instruction being received from the external device in the continuous connection established with the communication device, the first instruction indicating a start to provide a first type of service related to a communication device, the second instruction indicating a start to provide a second type of service related to the communication device, the continuous connection being used to perform server-push communication with the communication device;

a first determiner configured to, in response to a service stop request being received from the external device, determine whether the second type of service related to the communication device is currently provided, using status information indicating a status of providing service stored in the memory;

a first screen data transmitter configured to transmit first screen data for displaying a first setting screen to the external device in response to the first determiner determining that the second type of service is not currently provided, the first setting screen including a disconnection button to disconnect the continuous connection; and a second screen data transmitter configured to transmit second screen data for displaying a second setting screen to the external device in response to the first determiner determining that the second type of service is currently provided, the second setting screen not including the disconnection button.

* * * * *